May 7, 1935. B. B. KAHN 2,000,334
STOVE
Filed Aug. 24, 1931
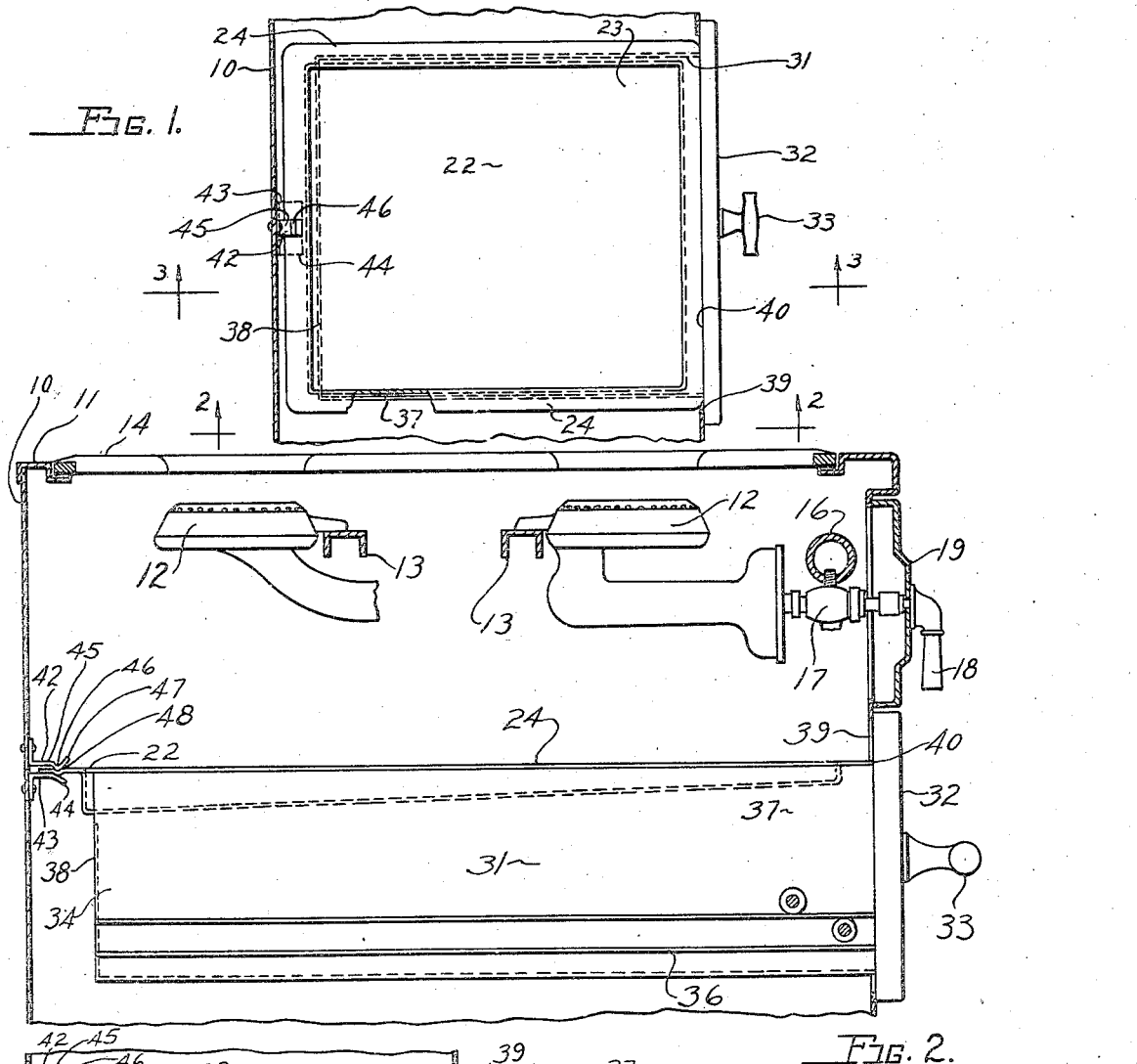
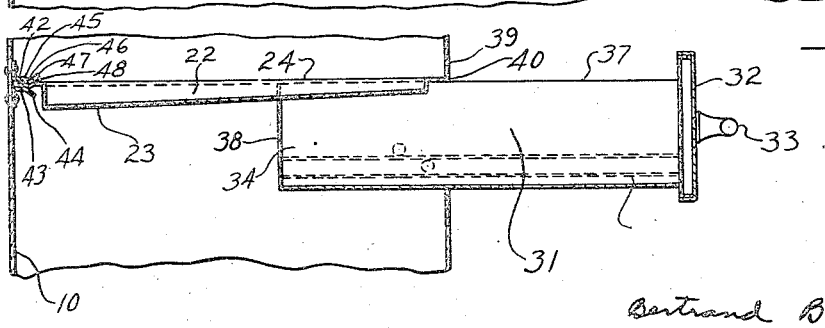
Inventor
Bertrand B. Kahn
By Maréchal and Noe
Attorneys Patented May 7, 1935

2,000,334

UNITED STATES PATENT OFFICE 2,000,334

STOVE

Bertrand B. Kahn, Cincinnati, Ohio, assignor to The Estate Stove Company, Hamilton, Ohio, a corporation of Ohio Application August 24, 1931, Serial No. 559,046

6 Claims. (Cl. 126—39)

This invention relates to stoves and more particularly to drip pans for use therein.

One of the principal objects of the invention is the provision of a stove drip pan of simple construction and of such character that it serves as a closure for a drawer positioned beneath it.

Another object of the invention is the provision of a movable drip pan which is supported by a stove drawer, and which may be releasably held in the position of use for movement on the drawer.

Another object of the invention is the provision of a slidable stove drip pan which is adapted to be supported on a stove drawer for movement therewith, and which may be releasably latched in retracted position with such tension that the frictional load of the pan on the drawer is overcome and the pan is thus held while the drawer may slide relatively thereto.

Other objects and advantages of the invention will be apparent from the following description, the accompanying drawing and the appended claims.

In the drawing, which discloses a preferred embodiment of the invention,

Fig. 1 is a horizontal sectional view through a stove constructed in accordance with the present invention;

Fig. 2 is a vertical sectional view taken on the line 2—2 of Fig. 1; and,

Fig. 3 is a vertical sectional view taken on the line 3—3 of Fig. 1.

The drawing, in which like characters of reference designate like parts throughout the several views thereof, illustrates a stove of the kitchen range type which comprises generally a frame structure 10 upon which is mounted a cooking top 11. Cooking top burners 12, which are shown supported from members 13, stand within the opening of the cooking top and beneath a vessel supporting grill 14. A suitable fuel manifold 16 is provided to which valves 17 are connected for the control of fuel to the several burners 12. The burner valves 17 are actuated by operating handles 18 positioned within convenient reach of the stove operator. A closure member 19 is positioned behind the handles 18 and serves to conceal the burner valves and associated parts.

The burner grill 14 as shown is constructed of spaced bars and thus provides for efficient heat transfer from the burners to the cooking vessels supported on the grill. The open grill permits drippings from the cooking vessels and other substances which may be spilled to pass through the grill and down into the stove body. In order to maintain the stove in a neat and attractive condition, and to provide for collection of such substances, a drip pan 22 is positioned beneath the burners. The pan is preferably of such size as to underlie the entire cooking top opening and it thus serves to catch and retain any substances which may pass through the grill 14. As shown, the drip pan comprises an integrally formed sheet metal member having a depressed or pit portion 23 which is enclosed by a flat bounding rim 24.

The drip pan is carried in the stove so as to serve as a closure for a drawer positioned beneath it and it thus effectively prevents dirt from entering the drawer. As shown, the drip pan 22 is supported within the stove upon the side walls of the drawer 31. This drawer may, for example, be a service drawer where utensils and other articles for stove use are stored. As shown, the drawer 31 comprises a drawer front 32 having a handle 33, and an attached box like portion 34 which is preferably fabricated from sheet metal and forms the bottom, rear and side walls of the drawer. The drawer is supported within the stove upon suitable guides, indicated generally at 36, which extend from the front to the rear, and upon which the drawer slides.

The top edge of the draw side walls 37, upon which the pan 22 rests, stand higher than the top edge of the drawer rear wall 38, and the top of the drawer front 32 terminates some distance above the top edges of the drawer sides. The drawer opening is of such size that the drawer front overlies this opening and provides a closure therefor. The space between the top edge of the draw sides 37 and the top of the drawer opening, designated by the numeral 39, permits ready access to the drip pan 22. The drawer rear wall 38 terminates a sufficient distance below the pan supporting side walls to permit the drawer to be moved outwardly while the pan is retained in the position of use.

Although the pan may be supported from the drawer in any suitable manner, the illustrated embodiment of the invention shows the pit portion 23 of the drip pan proportioned so that it is received within the side walls 37 of the drawer, while the bounding flange 24 overlies these drawer side walls and thus serves to slidably support the pan upon the drawer. The width of the pit portion is such that this depressed part is closely received between the side walls and thus serves to guide the pan in its movement on the drawer. The pan length, from front to rear of the stove, is such that when the pan is placed upon the drawer and the drawer is then closed, engagement of the front edge 40 of the pan with the rear side of the drawer front 32 causes the pan to be moved inwardly to the position of use within the stove.

In order to retain the pan in the position of use so that the drawer may be subsequently opened or closed without disturbing the pan setting, a latch 42 is provided and is so positioned that upon closing the drawer with the pan carried thereon the latch operates to engage and releasably hold the pan. As shown, the latch comprises a plate-like member 43 which extends from the rear wall of the stove structure 10 and terminates in a down turning edge 44. A latching member 45, which is preferably of some material which may be tensioned such, for example, as spring steel, projects from the stove wall and overlies the plate 43. A depressed portion 46 of the latch member 45 is adapted to engage a notch 48 that is formed in the flange at the rear of the pan 22. The latch member 45 terminates in an upwardly extending end 47, and this upturned end together with the downwardly extending end 42 of the plate member 43 serve to guide the rear end of the pan into engagement with the latch upon retractile movement of the pan, or when the drawer is closed with the pan upon it.

The tension of the spring member of the latch 42 is sufficient to overcome the frictional load of the pan on the drawer side walls so that having once latched the pan in place the drawer may then be moved at will without displacing the pan from its position of use. As the pan is relatively light in weight the tension required to hold the pan in place is so slight that intentional removal of the pan is not materially hindered. When it is desired to remove the pan it is only necessary to open the drawer 31 whereupon the operator may reach within the drawer opening and grasp the front edge 40 of the pan to withdraw it. During the movement of withdrawal the pan is supported upon the drawer side walls.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a stove, a drawer compartment, a drawer within said compartment, said drawer comprising drip pan supporting means extending in the direction of drawer movement, a drip pan carried by the supporting means and slidable therewith, and means on the stove to retain the pan in the position of use to permit movement of the drawer relatively to the pan.

2. In a stove, a drawer compartment, a drawer within said compartment, a drip pan slidably carried by said drawer, and means engageable with the pan upon movement to the position of use by closure of the drawer to retain the pan in retracted position for movement of the drawer relatively to the pan.

3. In a stove, a drawer compartment, a drawer within said compartment, a drip pan slidably carried by said drawer, and spring tensioned latch means on the stove operable to engage the pan upon movement to the position of use by closure of the drawer, said means retaining the pan in position of use to permit movement of the drawer relatively to the pan.

4. In a stove, a drawer compartment, a drawer within said compartment, said drawer comprising spaced side walls extending in the direction of drawer travel, a drip pan carried by the drawer side walls and slidable therewith, and latching means on the stove positioned to engage the pan upon retraction thereof, said latching means acting to releasably hold the pan in the position of use under tension sufficient to overcome the frictional drag between the pan and the drawer side walls.

5. In a stove, a drawer compartment, a drawer within said compartment, a drip pan carried by said drawer and slidable therewith, said pan comprising a pit portion and a flange portion, and latching means on the stove to retain the pan in the position of use to permit movement of the drawer relatively to the pan, said latching means presenting an inclined face to the pan flange edge to direct the pan into latching engagement.

6. In a stove, a drawer compartment, a drawer within said compartment, said drawer comprising drip pan supporting means extending in the direction of drawer movement, a drip pan carried by the supporting means and slidable therewith, said pan having a shallow front end affording access to the drawer interior and a deepened rear end providing a reservoir for the collection of drippings, and means on the stove to retain the pan in the position of use to permit movement of the drawer relatively to the pan.

BERTRAND B. KAHN.